United States Patent

Grewe et al.

[11] 3,863,895
[45] Feb. 4, 1975

[54] WHEEL RAMP

[75] Inventors: Ronald E. Grewe, Delphos; Eugene L. Hoersten, Kalida, both of Ohio

[73] Assignee: The Huffman Manufacturing Company, Miamisburg, Ohio

[22] Filed: June 7, 1973

[21] Appl. No.: 367,854

[52] U.S. Cl. .................................. 254/88, 14/72
[51] Int. Cl. .................................................. E02c 3/00
[58] Field of Search .................. 14/72, 71; 254/88; 214/38 CB; 248/354, 165

[56] References Cited
UNITED STATES PATENTS

| | | | |
|---|---|---|---|
| 1,548,189 | 8/1925 | Costello | 254/88 |
| 1,791,986 | 2/1931 | Vehon | 254/88 |
| 1,922,550 | 8/1933 | McCosh | 254/88 |
| 2,924,427 | 2/1960 | Larson | 254/88 |
| 3,638,910 | 2/1972 | Nellis | 248/165 X |

*Primary Examiner*—Nile C. Byers, Jr.
*Attorney, Agent, or Firm*—Biebel, French & Bugg

[57] ABSTRACT

A wheel ramp which is formed with rigid, longitudinally extending side frames interconnected by separate, transversely extending treads and transversely extending feet, both of which are attached to the side frames by self-tapping screws. A cross bracing plate is bolted to forward ends of the side frames for additional support, and a stop member formed integrally therewith extends upwardly over the forward end of the ramp and has wheel engaging portions disposed rearwardly of the forward end of the ramp. The transverse spacing between the side frames is such that the loads imposed on the ramp are for the most part borne directly by the side frames, with very little bending moments being applied to the treads. To improve the stability of the ramp, the transversely extending feet extend outwardly beyond the side frames to prevent tipping in this direction and the disposition of the wheel engaging portion of the stop member rearwardly of the front of the ramp prevents kicking up of the ramp as a vehicle is driven up on it. In this disclosure "front" or "forward" are used in the context of the front wheels of an automobile being supported by the ramps. The ramps are equally useful in supporting the rear wheels with the automobile being backed onto them. The main load resisting components of the rigid side frames are formed of tubular construction and not only provide greatly improved load capacity, but facilitate attachment of the treads and the cross bracing plate to the side frames. All subassemblies and other components are substantially flat or planar for compact packaging for sale.

8 Claims, 5 Drawing Figures

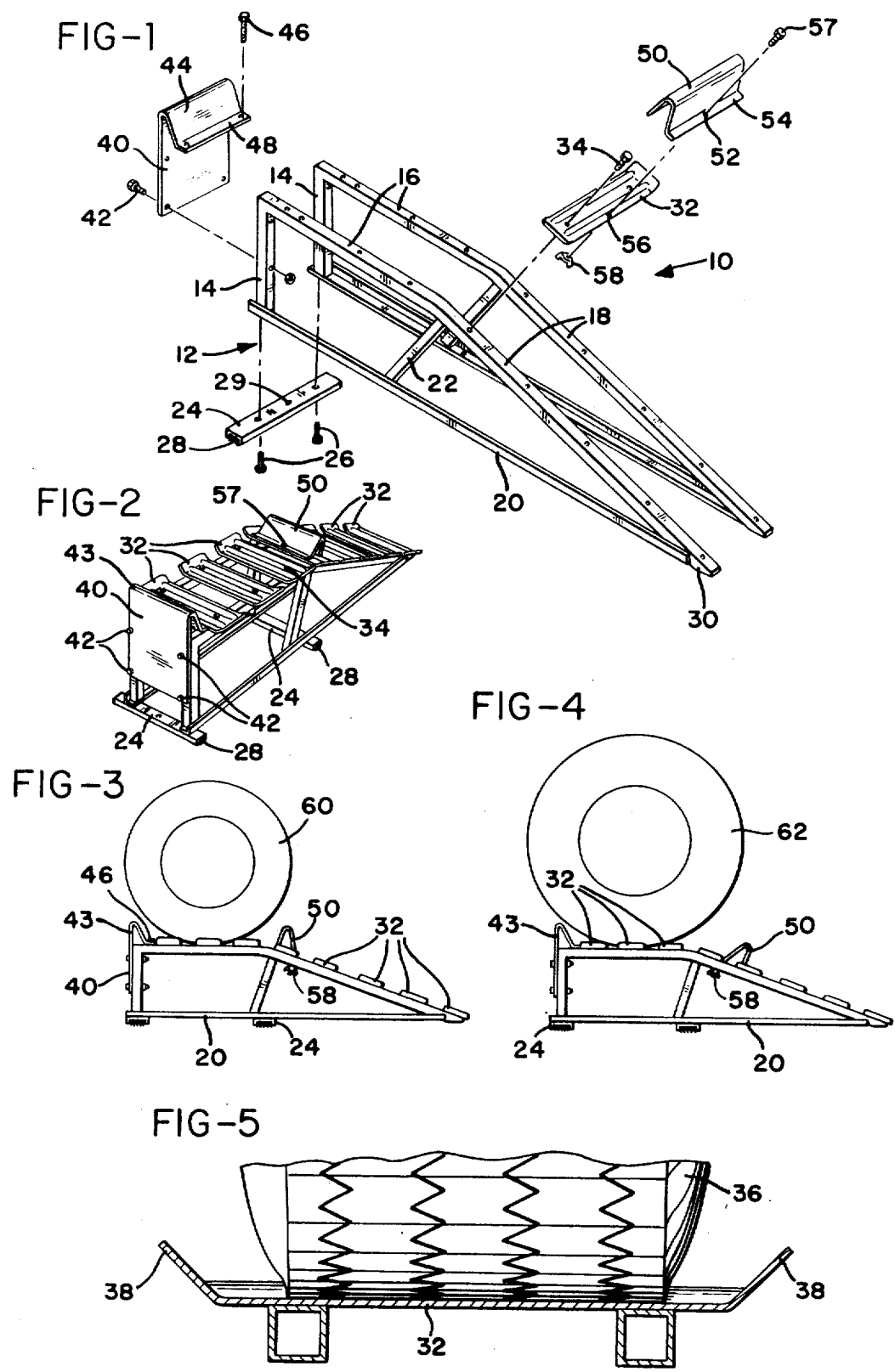

WHEEL RAMP

BACKGROUND OF THE INVENTION

There are, generally speaking, two types of portable wheel ramps. In one the components of the ramp, that is the treads and supporting framework, are rigidly interconnected by welding to form an integral unit. While this provides a rugged construction, it is not easily packaged for shipping.

In the other type of wheel ramp, which may be called a demountable type, the components of the ramp are packaged disassembled and then later assembled by means of threaded fasteners. In ramps of the demountable type, prior art structures incorporate rigid cross bracing frames transverse of the assembly, which are integral as supplied, interconnected by longitudinally extending individual extending braces which are bolted to the cross frames.

In a variation of the demountable type ramp, the wheel engaging surfaces of the ramp are formed as a rigid unit and longitudinal and cross bracing members are bolted or otherwise attached to the wheel engaging tread. This latter construction has the disadvantage that the rigid tread portion thereof also presents packaging problems, although not to the extent of the integral units.

Typically, the side frame members of prior art demountable ramps are formed of angle members with one leg of the angle member being horizontally disposed and supporting the treads of the ramp. With this construction, the treads must bear and transfer the loads imposed on the ramp to the side frames and are subjected to considerable bending moments which often result in deformation of the treads. Additionally, the use of angle members as the side frames requires a substantially heavy section to be used for a given load rating.

Although it is common to provide some sort of stop on the ramp adjacent its forward end, in prior art structures these stops are usually positioned at the forward ends of the ramp. As a result, if a vehicle rides up on the stop even a slight amount there is a tendency of the rear section of the frame to kick up, resulting in possible damage to the rocker panels of the vehicle.

SUMMARY OF THE INVENTION

The present invention provides a wheel ramp of the demountable type which includes a pair of rigid, longitudinally extending side frames interconnected by transversely extending treads, supporting feet, and a cross bracing plate attached to the forward ends of the side frames by bolts. By forming the side frames as rigid, substantially integral units, improved resistance to dynamic forces imposed on the ramp as a vehicle moves onto it are provided.

Additionally, the use of rigid longitudinal side frames permits the use of segmented treads without loss of strength. In this regard, it will be noted that the side frames are spaced with respect to each other inward from the outer ends of the treads such that the loads imposed on the ramp are borne more or less directly by the side frames, with very little binding moments being taken up by the treads themselves. This permits a lighter tread to be utilized.

In accordance with the present invention, those portions of the side frames to which the treads are attached are formed as substantially rectangular, tubular members. This provides a much stronger member, as compared to conventional angle shaped members, for the same weight.

The feet extend transversely of the ramp and are attached to the side frames by self-tapping screws and have portions which extend outwardly beyond the frames to prevent tipping. Additionally, the outer ends of the feet are provided with skid resisting pads.

It will also be seen that the cross bracing plate has a stop member formed integrally therewith which extends upwardly over the front of the ramp, and wheel engaging portions of the stop member are disposed rearwardly of the front end of the ramp to prevent kicking out of the ramp when the stop member is engaged by a wheel.

Thus, the ramp of the present invention provides the advantages of demountable ramps in that it may assume a very compact configuration for shipping, yet provides improved load capacity while using lighter weight components.

BRIEF DESCRIPTION OF THE DRAWINGS

FIG. 1 is an exploded perspective view of a wheel ramp in accordance with the present invention;

FIG. 2 is a perspective view of the ramp taken from the forward end thereof;

FIG. 3 is a side view showing a safety stop as it is attached when the ramp is used for relatively small diameter wheels;

FIG. 4 is a view similar to FIG. 3 showing the safety stop reversed when it is used for relatively large diameter wheels; and FIG. 5 is a cross sectional view through the ramp showing a wheel supported thereby.

DESCRIPTION OF THE PREFERRED EMBODIMENTS

As best in FIGS. 1 through 4 of the drawings, a wheel ramp 10 in accordance with the present invention includes a pair of rigid, longitudinally extending side frames 12 extending in spaced parallel relationship to each other. Each of the side frames 12 includes an upright front section 14, a substantially horizontal upper section 16 and an inclined section 18 extending rearwardly and downwardly from the rear end of the upper section 16.

Preferably, the sections 14, 16 and 18 are formed of a structural steel member of substantially rectangular tubular cross sectional configuration. A lower section 20, which may be an angle member, extends from the lower end of the front section 14 to the rearward end of the inclined section 18 and is attached to each by welding. Additionally, a strut 22 of rectangular tubular construction extends from the lower section 20 upwardly to the inclined section 18 and is joined thereto by welding.

A pair of feet 24 extend transversely of the two side frames 12 and are attached to the bottom sections 20 by means of self-tapping screws 26. Each of the feet 24 extends transversely outwardly beyond the side frames and is provided with a pair of skid resistant rubber pads 28 on its outer ends and a hole 29 for storage of the ramp on a hook or nail. It will also be noted that the lower rear end of the inclined section 18 is flattened slightly, as at 30, to provide a pair of feet at this point.

A plurality of separate treads 32 are attached to the upper surfaces of the upper and inclined sections 18 by means of self-tapping screws 34. The spacing between the side frames 12 is such that they are positioned inwardly of the outer ends of the treads 32. Thus, as best seen in FIG. 5, a wheel 36 supported by the ramp imposes very little bending moments on the treads 32 and the major portion of the load is transmitted directly to the upper and inclined sections 16 and 18, depending upon where the wheel is positioned on the ramp.

In this regard, it will be noted that by utilizing a tubular construction for the load supporting sections 16 and 18, a substantially lighter member can be used than would be the case if the sections 16 and 18 were of angle shape. It will also be noted from FIG. 5 that the outer ends of the treads 32 are turned upwardly, as at 38, to help center the wheel on the ramp and prevent it from running over the edge.

At its forward end the ramp is provided with a cross bracing plate 40 which is bolted to the uprights 14 by a series of four bolts 42 extending through the plate 40 and the forward and rear walls of the uprights 14. This provides a rigid cross bracing, resisting collapsing forces applied to the ramp.

Formed integrally with the plate member 40 is a stop member 43 which extends up over the front end of the ramp and has a wheel engaging portion 44 positioned rearwardly of the front of the ramp. Self-tapping screws 46 extend through a flange 48 of the stop member and the upper surface of the upper member 16.

A safety stop 50 is provided with an opening 52 through a flange 54 thereof and each of the treads 32 are provided with a centrally located opening 56 therethrough. Thus, as seen in FIGS. 2 through 4 of the drawings, the safety stop 50 may be attached to the ramp after a wheel is positioned on the upper section thereof by means of the bolt 57 passing through the openings 52 and 56 and secured in place by a wingnut 58.

If a relatively small diameter wheel is received on the upper section of the ramp, as shown at 60, the safety stop 50 is positioned as indicated in FIG. 3. On the other hand, if a relatively large diameter wheel 62 is received on ramp 10, the safety stop 50 is positioned as indicated in FIG. 4 of the drawings.

With the above construction it will be seen that, in contrast to prior art demountable wheel ramps, the longitudinally extending side frames of the ramp are formed as continuous rigid members while the cross bracing is formed of a series of separate pieces which are attached to the side frames.

This permits the ramp, prior to its assembly, to assume a compact configuration for packaging. Further, the continuous, integral construction of the side frames allows the tread sections to be segmented without loss of strength.

Additionally, by forming the longitudinally extending side frames as rigid members, the ramp is better able to resist the dynamic forces on the structure as a vehicle is driven up the ramp. It will also be noted that by spacing the side frames inwardly of the outer ends of the treads, a substantial portion of the loads imposed on the ramp are transferred directly to the side frames with minimal imposition of bending loads on the treads.

The combined plate and stop member at the front end of the ramp not only provides cross bracing against forces tending to collapse the ramp transversely thereof, but also serves to anchor the stop member in place rearwardly of the front of the ramp. This disposition of the stop member with respect to the front of the ramp eliminates the tendency of the ramp to kick out when the forward stop is engaged by the wheel of a vehicle.

It will also be seen that the use of tubular members for the main load supporting elements of the side frames permits a much lighter structural unit to be utilized for a comparable load than would be the case if a structural shape such as an angle member were used.

While the form of apparatus herein described constitutes a preferred embodiment of the invention, it is to be understood that the invention is not limited to this precise form of apparatus, and that changes may be made therein without departing from the scope of the invention.

What is claimed is:

1. A demountable wheel ramp comprising:
   a. a pair of spaced apart, longitudinally extending, substantially flat, rigid side frames each formed of a plurality of side frame members lying substantially in a single plane,
   b. means interconnecting permanently all of said side frame members of each side frame, forming integral side frames each having an upper section and an inclined section extending downwardly and rearwardly from said upper section,
   c. transverse cross bracing extending between and interconnecting said spaced apart side frames,
   d. said cross bracing including a plurality of separate, transversely extending treads mounted on said upper and inclined sections of said spaced apart side frames, and
   e. readily disengagable fastening means attaching said cross bracing to said integral side frames and forming with said integral side frames a complete wheel ramp while permitting ready detachment of said cross bracing from said side frames,
   f. whereby said cross bracing and treads can be removed readily from said integral side frames and said side frames and cross bracing can be collapsed into a substantially flat, compact package for shipping and storage.

2. The ramp of claim 1 wherein:
   a. opposite ends of said treads extend outwardly beyond said side frames.

3. The ramp of claim 1 wherein:
   a. said cross bracing further includes transversely extending feet projecting outwardly beyond said side frames.

4. The ramp of claim 3 wherein:
   a. stop means is provided on said ramp adjacent a forward end thereof, and
   b. at least one of said feet extend across and beneath said side frames forwardly of wheel engaging portions of said stop means.

5. The ramp of claim 1 wherein:
   a. said readily disengageable fastening means comprises threaded fasteners.

6. The ramp of claim 1 wherein:
   a. said cross bracing includes a plate member attached to said longitudinally extending side frames adjacent a forward end thereof.

7. The ramp of claim 6 further comprising:
   a. stop means formed integrally with said plate member and having wheel engaging portions located rearwardly of a forward end of said ramp.

8. The ramp of claim 1 wherein:
   a. that portion of said longitudinally extending side frames to which said tread means is connected is of substantially rectangular tubular cross sectional configuration.

* * * * *